United States Patent [19]
Van Roekel et al.

[11] Patent Number: 5,559,938
[45] Date of Patent: Sep. 24, 1996

[54] DISPLAY SYSTEM FOR DISPLAYING A NET OF INTERCONNECTED GEOGRAPHICAL PATHS PROVIDED WITH ASSOCIATED GEOGRAPHICAL NAMES AND ROAD VEHICLE WITH ON-BOARD ROAD-BASED NAVIGATION SYSTEM HAVING SUCH DISPLAY SYSTEM

[75] Inventors: Jauke Van Roekel, Laufdorf; Georg E. Kaeser, Herborn, both of Germany

[73] Assignee: U.S. Philips Corporation, New York, N.Y.

[21] Appl. No.: 333,570

[22] Filed: Nov. 2, 1994

[30] Foreign Application Priority Data

Nov. 5, 1993 [EP] European Pat. Off. .............. 93203106

[51] Int. Cl.⁶ ....................................................... G06T 3/00
[52] U.S. Cl. ............................ 395/141; 395/140; 395/161
[58] Field of Search ........................... 395/141, 133–139, 395/140, 152, 153, 154, 155–161

[56] References Cited

U.S. PATENT DOCUMENTS 4,638,438   1/1987   Endo et al. ........................ 395/150 X
4,914,605   4/1990   Loughmiller, Jr. et al. ........ 395/137 X

FOREIGN PATENT DOCUMENTS 181012   5/1986   European Pat. Off. ..

Primary Examiner—Almis R. Jankus
Attorney, Agent, or Firm—Robert J. Kraus

[57] ABSTRACT

Display system for displaying a net of interconnected geographical paths provided with associated geographical names and road vehicle with on-board road-based navigation system having such display system The display system allows to display a steady net of distinct and interconnected geographical paths and stores the net as an arrangement of vectors each associated to a particular path. First, an intended selection is read from the net for displaying. The storage contains the vectors often provided with an associated geographical name. For easy and clear display, the system has a font generator for the path name for when ready for display, displaying the name as a row of characters alongside its associated displayed path while featuring a multi-valued and finite orientation repertoire for the characters.

11 Claims, 5 Drawing Sheets

DISPLAY SYSTEM FOR DISPLAYING A NET OF INTERCONNECTED GEOGRAPHICAL PATHS PROVIDED WITH ASSOCIATED GEOGRAPHICAL NAMES AND ROAD VEHICLE WITH ON-BOARD ROAD-BASED NAVIGATION SYSTEM HAVING SUCH DISPLAY SYSTEM

Display system for displaying a net of interconnected geographical paths provided with associated geographical names and road vehicle with on-board road-based navigation system having such display system.

BACKGROUND OF THE INVENTION

The invention relates to a display system for displaying a steady net of distinct and interconnected geographical paths and containing storage means for storing said net as an arrangement of vectors each associated to a particular said path, select means for signalling an intended selection from said net, reading cum routing means controlled by said select means for reading said storage means and outputting said selection, and display means for displaying said selection. Geographical paths include various kinds of roads on land or water. The visual representation thereof has proven advantageous for purposes of route planning and navigation, such as by motor car, for designing public facility arteries, for educational purposes, and others. The storage of a net in the form of vectors is very storage effective, inasmuch as each vector may be sufficiently well represented by means of an identifier, origin, length, orientation, identifiers of connecting vectors, and a few additional qualifiers that may indicate capacity, character, and a few additional attributes. This listing however, is neither exhaustive nor limitative. Storage of a road network of this kind has been described in EP 181.012 corresponding U.S. patent application Ser. 07/772, 062 (PHN 11.122) to the assignee of the present application. Designers of such systems have found that the generally non-expert user person needs additional clues as to what action should be taken next, and even information regarding generally relevant geographical items, such as geographical names, without however, necessitating complex hardware or software, which for the general public would not be considered cost-effective. In particular in an environment where the orientation of the map with respect to the display device may be variable, the display of names may need attention.

SUMMARY OF THE INVENTION

Accordingly, amongst other things, it is an object of the present invention to provide a display system of the kind described that offers improved ease of recognition of the geographical information through the provision of geographical names, together with allowing various processing additives for realizing an improved human interface, without requiring high investments in processing and/or storage facilities. Therefor, according to one of its aspects, the invention is characterized in that said storage means contain said vectors at least in part provided with an associated geographical name, said display means comprise font means for generating a character font for said name when passed along said reading cure routing means, and said display means are arranged for displaying said name as a row of characters alongside its associated displayed path while featuring a multi-valued and finite orientation repertoire for each character in said row. Font addressing is straightforward and requires little ROM per character while needing no processing of any higher level character representation. It has been found that only a very limited number of different orientations will provide appropriate readability. Moreover, several different orientations can be derived from a single ROM character, such as by interchanging X- and Y-coordinates, or inverting one of the coordinates to rotate the character over 180 degrees.

Advantageously, said font means have at least one distinct font for each different orientation in at least a subset of said repertoire. Through accessing a single font in a variety of different ways, the number of stored fonts may be much less than the number of character orientations. In an advantageous realization, there are only two fonts and eight different character orientations.

Advantageously, said routing means transmit a fraction of the street names contained in said selection while blocking further names as an anti-clutter measure. Especially, names crossing and partly obscuring each other would be a good target for such an anti-clutter measure.

Advantageously, said display means are arranged for displaying a single name associated to a non-straight path as a string of characters that has variations in either character orientation or row orientation between respective characters. This allows for providing paths of arbitrary shape to get a name displayed that closely follows the path itself. Through introducing hysteresis, a quiet representation is produced.

The invention also relates to a road vehicle having an on-board road-based navigation system comprising a display system for displaying a road map with geographical name representation according to the invention. In particular for fast and reliable navigation through complex environments, such vehicle is easier to control than conventional vehicles.

Various further advantageous aspects are recited in dependent claims.

BRIEF DESCRIPTION OF THE DRAWING

These and other aspects and advantages of the invention will be further explained with reference to the description of preferred embodiments hereinafter and, in particular, to the appended figures in which.

DESCRIPTION OF THE PREFERRED EMBODIMENTS

Figure 1:
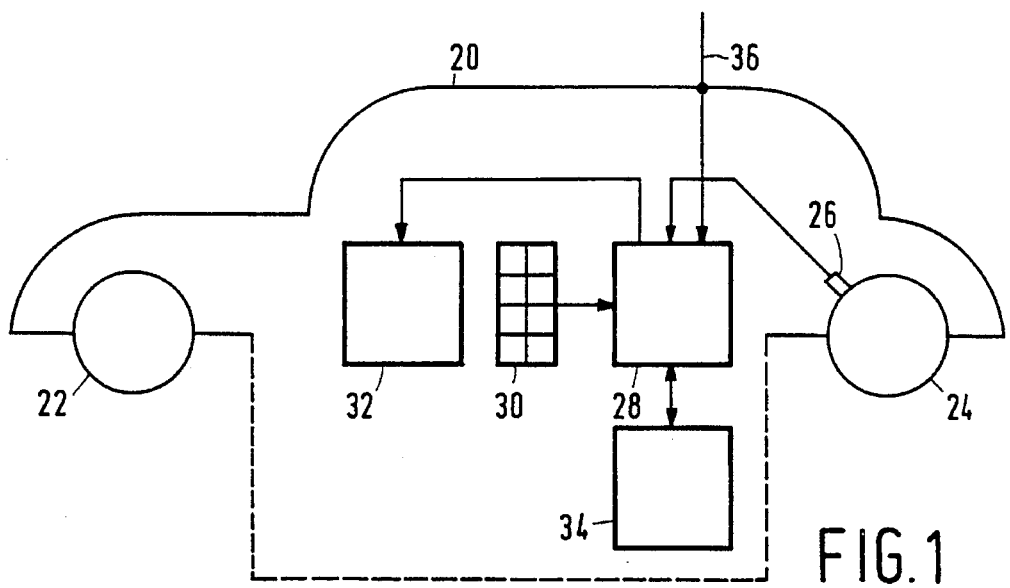
FIG. 1 shows a vehicle with a display system according to the invention.

FIG. 1 shows a vehicle with a display system according to the invention as used in a car navigation system. Directly recognizable are car body 20 and car wheels 22, 24. CD-ROM player cure disc 34 store a geographical data base. Sensor arrangement 26 may comprise various types of sensors, such as for speed, lateral acceleration, and other. Board computer 28, from the sensed data may calculate an estimated displacement of the car. Given an initial position, this yields an estimated actual position. The computer may retrieve an environment of the estimated actual position from CD-ROM 34 and map the estimated position on a most probable on-road position in so-called dead-reckoning. The environment may be windowed for display on display sub-system 32. Input means 30, such as a keyboard, are used for inputting actual initial position and intended destination, so that the computer may determine which route should actually be taken. Radio data (RDS) is received via antenna 36 and combined with actual position as calculated and data from the data base to produce indications to a user for imminent actions, dangers, choices, and general interest as appropriate with respect to the; actual position of the vehicle. For example, the radio data may signal a blocked road, that cannot be used for the time being. The radio data may even indicate a particular path as having temporarily another quality, such as the route of the Tour the France, which then would be subject to displaying in a particular manner. Various subsystems of the above system can be omitted for the display according to the invention to be still effective. On a lower level, the display can be used as an alternative for a printed map.

Figure 2:
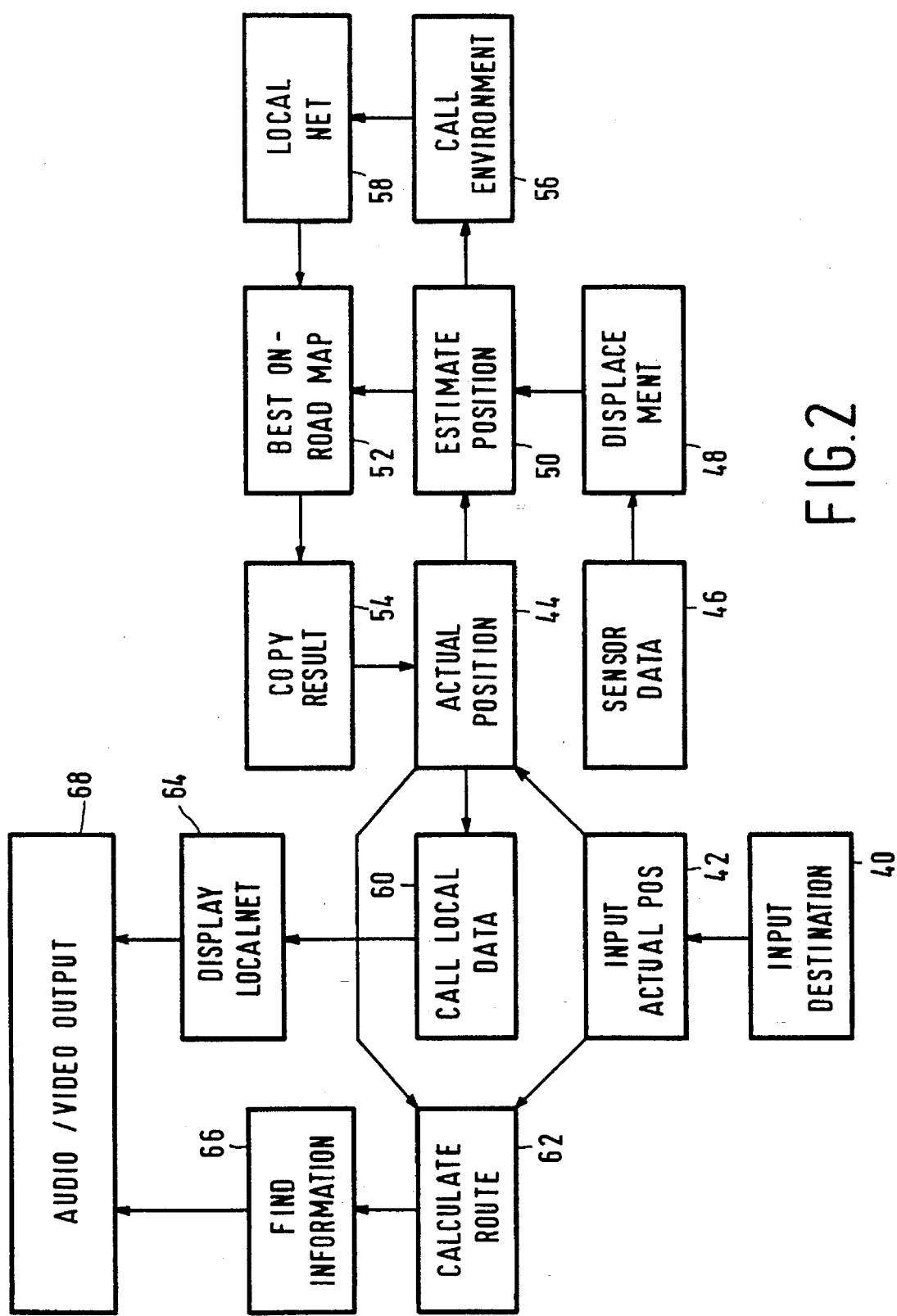
FIG. 2 shows an interaction diagram of the main subsystems within a navigation system.
Figure 5A:
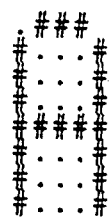
FIGS. 5a–5l show a font set for various characters.
Figure 5B:
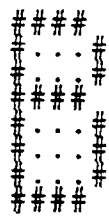
Figure 5C:
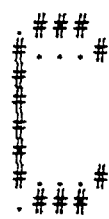
Figure 5D:
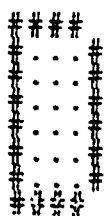
Figure 5E:
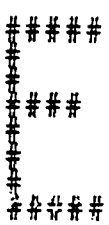
Figure 5F:
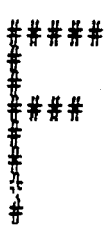
Figure 5G:
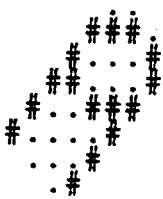
Figure 5H:
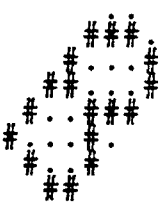
Figure 5I:
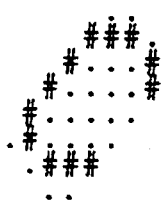
Figure 5J:
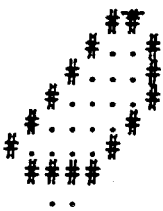
Figure 5K:
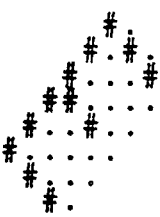
Figure 5L:
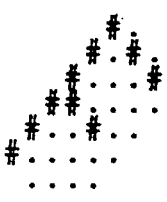

FIG. 2 shows an exemplary interaction diagram of the main subsystems within a navigation system. First, the user person inputs the destination (40) and the initial position (42). From these, the route to be taken is calculated (62), and the information to be presented next to the user is formulated (66). Also, the initial position is copied as actual position (44). From measured sensor data (46) the displacement is calculated (48) and added to actual position as estimated position (50). From the latter, the environment is accessed in the data base (56), and a representation of the local net is stored (58). From this, the best on-road position is found (52) and copied (54) as new actual position. From the new actual position, the route may be recalculated (62). Also, the actual position calls local data from the data base (60), from which a local net is selected for display (64). The information (66), and the display (64) may give audio and/or video output to a user (68). It should be understood that the above is by way of non-limitative detailing only.

Figure 3:
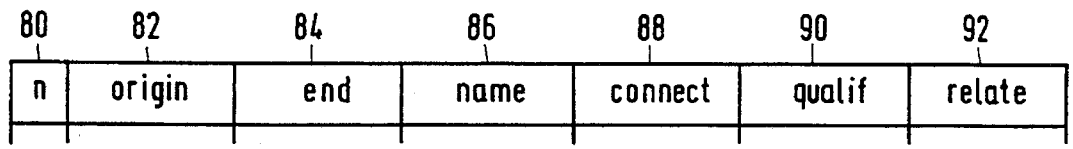
FIG. 3 shows storage organization within the geographical data base.

FIG. 3 gives an exemplary storage organization within the geographical data base. The figure pertains only to a single road or path. Field 80 contains the identifier of the road, such as a number. Field 82 contains the geographical origin, such as a set of coordinates. Field 84 likewise contains the end of the road. Field 86 contains the name of the road. Field 88 indicates the connecting roads. Another realization is that for each termination of the road in question only a single further connecting road is mentioned, to wit, the next one terminating in the same node, when going at that node in clock-wise direction, starting from the original path. Still another realization is by omitting all references to connecting roads; this necessitates scanning of all paths within a bucket called to front storage, but nevertheless this can be effective as well. Field 90 contains one or more qualifiers of the road, such as main or secondary, one-way or two-way. Field 92 contains relations, such as to particular features, such as a list of hotels, that may contain a hotel close by this road. If a road has curves or other deviations from a straight line, such as temporary doubling of the road into two branches, it is divided into straight segments that are directly linked in the data base by some additional indicator.

Figure 4:
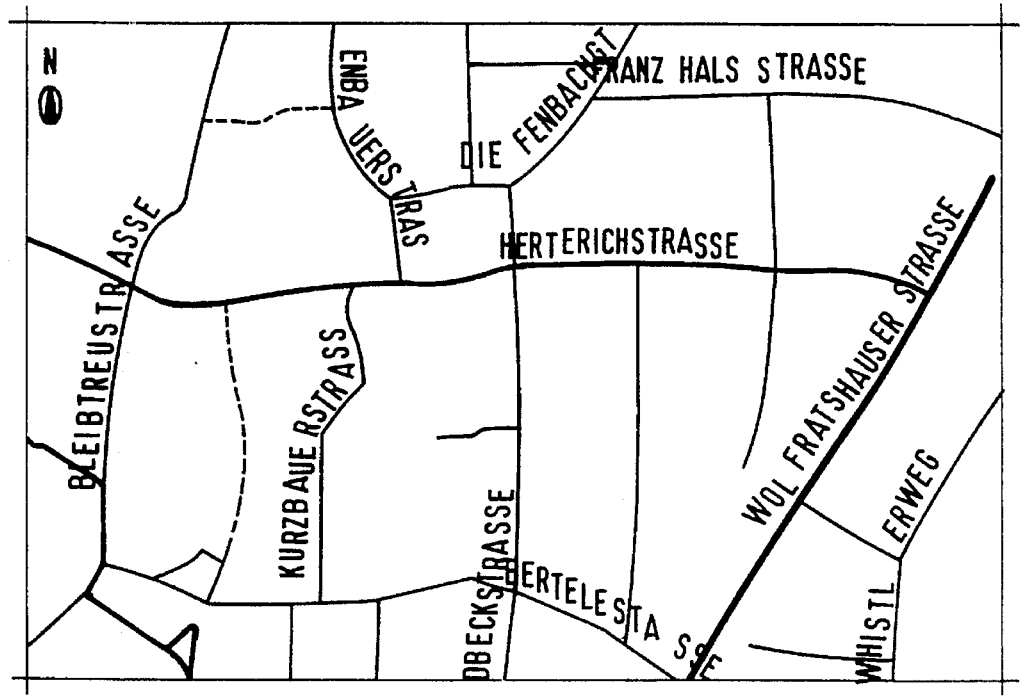
FIG. 4 shows an exemplary display frame.

FIG. 4 shows an exemplary display frame of a small part of a street map. There are four road categories, to wit first class (Wolfrathshauserstrasse), second class (Herterichstrasse, and an unnamed street in the lower left corner), third class (eight named streets and a few unnamed ones), and fourth class (field roads, not named). As shown, characters have a set of various different orientations. For the initial point of a road, only four of these are allowed, as defined by the connecting line through the first and last points of the path in question. For subsequent characters of the name, through subsequent curvature of the path, all eight orientations become feasible. The orientation of a character is roughly related to the orientation of the associated path, but some variation of the latter is possible as will be explained hereinafter. The control of the character orientation will be discussed later. It should be noted that the characters in a row can be shifted with respect to each other, causing an apparent row direction that differs from the orientation of each particular character. As shown, various streets are broken, curved, or have other deviations from a straight line. In this case they are stored as a string of straight sections, that can be found in the data base in that they are directly stringwise coupled. In such case also the characters of a single name may be displayed as multiple sub-rows that need not have the same row and/or character orientations. In that case, the name to be displayed may be associated to one of the middle segments thereof causing the display to begin there as exemplified by the Herterichstrasse. As shown, the number of street names may be less than the number of streets actually displayed. This limiting can be controlled in various ways, for example through counting the number of names and stopping when a particular limit has been attained.

FIGS. 5a–5l show a font set for various characters, which for brevity has been shown only for characters A through F, both in vertical or standard orientation, and in an orientation that is rotated by +45 degrees with respect to this standard orientation. Only capital characters have been implemented in this example. The font is shown as a bit map that fits within a 5 by 8 pixel character field for characters in standard orientation, and in an 8 by 8 pixel bit map for rotated orientation. To display a horizontal row of characters in standard orientation, the characters may be spaced by one or two space columns. To display a row of characters of which both row direction and characters are rotated over 45 degrees, the square character fields have their corners cut off, as shown in FIG. 7, thereby attaining more or less uniform inter-character spacing, regardless of the orientation. Several additional features will be discussed with respect to FIGS. 7a–7e. The above set of fonts has been given by way of example only; a somewhat more refined organization could have the minimum step between successive font orientations reduced from 45 degrees to 30 degrees or even less.

Figure 6A:
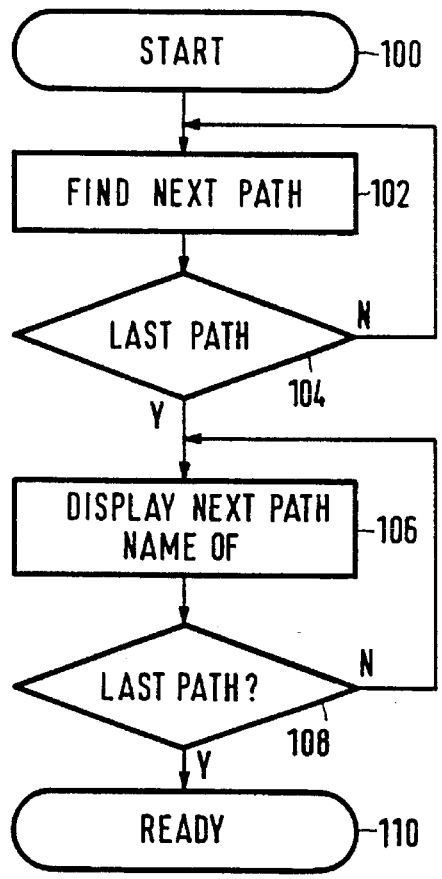
FIGS. 6a,6b show a set of flow charts for the display.
Figure 6B:
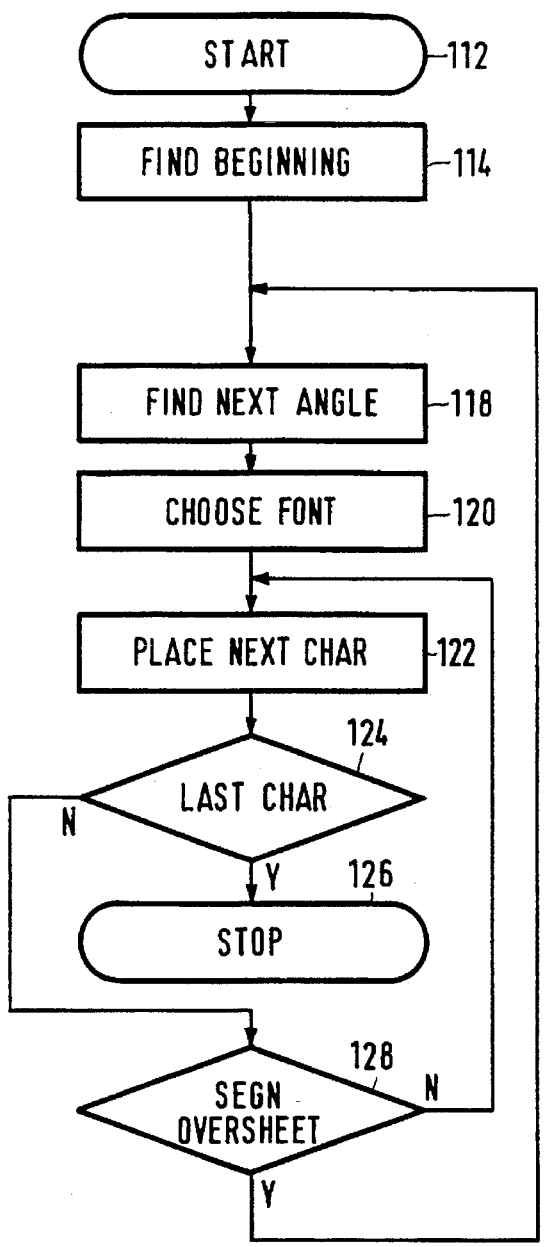

FIGS. 6a, 6b show an exemplary flow chart set for the display. First, FIG. 6a shows the overall structure. Here, it is supposed that for each next window the geography may be shifted as well as rotated. If the geography is only shifted, the display shape of the earlier window may be retained, so that only the new part to be displayed must be evaluated, while abandoning display of the part now falling outside the window; it is understood that after calculating what is to be displayed, this may be stored in a picture store that may or may not contain information pertaining to border regions just outside the display proper. In block 100 the process initializes, for example by loading information of one or more so-called buckets from the data base that contain the information necessary to be displayed. Within a bucket, paths at their terminations point to other paths; across bucket boundaries also a linking reference organization is available. In block 102 the paths to be displayed are found in succession; in block 104 it is checked whether all paths have been considered adequately. A path crossing the edge of the window to be displayed generally does not connect to further paths to be considered. The display may be effected directly upon finding the path in question, or may be delayed until finding of all paths, or even until finding of all names to be displayed. In block 106 the display of the various names is successively approached and calculated, and in block 108 it is checked whether all names have been considered adequately. The names are only those that relate to the paths found in the loop 102, 104. Again here, the display may be effected directly upon finding of the name in question, or be delayed until considering of all names has been done.

FIG. 6b shows the procedure for displaying a single name. First, in block 112 the procedure is initated by loading the data of a particular path. It is understood that the data as stored in steady state in the background store have been transformed by rotation and or translation, so that the first and last point of the path are known. First, the relative positions of these two points are compared to therefrom determine the initial point, where the name displaying should start (114). As discussed, certain segments of the path in question may be ignored for this procedure, in that the name has been associated with one of the later or middle segments. Generally, for European languages, now the first point of a path is the point lying most leftward. However, for the interconnecting straight line lying nearly vertical, the displaying may start at the top end. Next, the slope angle of the first straight segment of the path in question is determined (118). From this angle, the font to be used is chosen as will be explained with reference to FIG. 7 (120). Next, the first character of the name is positioned, starting from a pixel that has a predetermined relative position to the starting point of the path (122). In block 124 it is detected whether the most recent character was the last one of the name in question. If yes, the procedure stops in block 126, and the next name may be accessed for display (block 106 in FIG. 6a). If no, in block 128 the procedure detects whether the rear edge of the character extends beyond the end of the most recent straight-line segment of the path that is to be named. If no, the next character may be retrieved for positioning while retaining the actual font (122). If yes, the angle of the next straight-line segment must be determined in block 118, and the loop starts again. As will be explained with reference to the following, the procedure of FIGS. 6a, 6b is rather simplified, but offers wide opportunity for refinement as explained hereinafter.

Figure 7A:
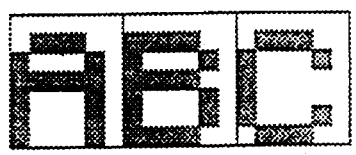
FIGS. 7a–7e show special display effects.
Figure 7B:
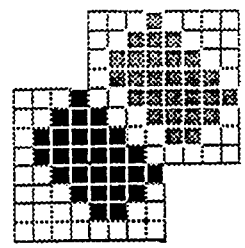
Figure 7C:
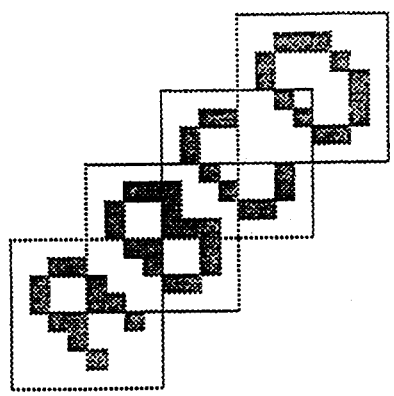
Figure 7D:
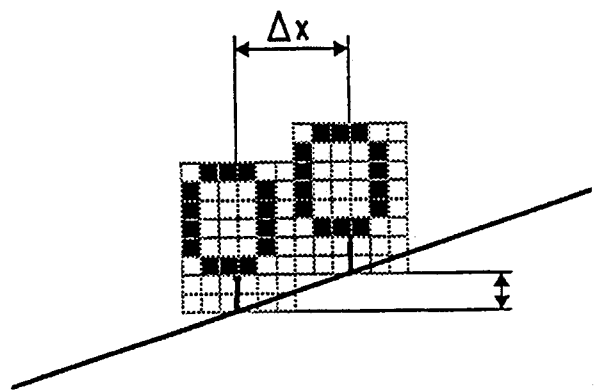
Figure 7E:
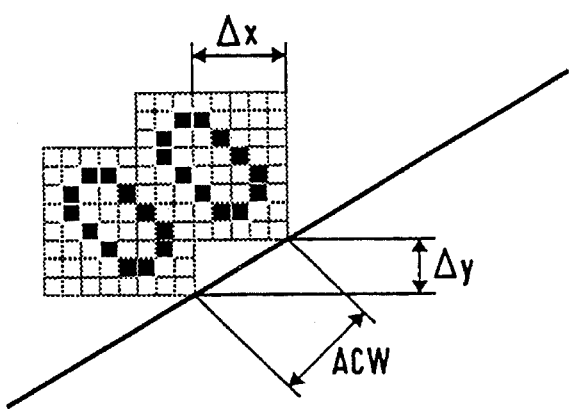

FIGS. 7a–7e show various special effects. First, FIG. 7a shows a horizontal row of characters that each have the standard position. As shown, the 5×8 fields of the characters proper are spaced from each other by a single column of space pixels. FIG. 7b shows two character fields of 8×8 pixels that each accommodate a respective character in a relatively dark indicated subfield that is oriented according to a 45 degree rotation. Also, the fields are sequenced along an orientation that is rotated over 45 degrees. As shown, each character field loses as it were, a triangle of 6 pixels each time where it abuts to a preceeding or succeeding character field. FIG. 7c, in the same way as in FIG. 7a shows a row of actual characters that is rotated over 45 degrees with respect to FIG. 7a. FIG. 7d shows a text that is drawn along a path that is neither horizontal, nor at 45 degrees. Such so-called curved text is drawn with rotated fronts, each next rotation over 45 degrees implying a change-of-font. The polyline, a path that has been divided into straight segments that have mutually different directions, has first the character orientation and next the character position calculated separately for each respective segment. As shown in FIG. 7d, a straight path that is oriented at less than 15 degrees rotation always has its characters, here fitting in a character field of 6×5 pixels, in the standard position, with a one pixel column of space pixels in between. The vertical position of each character is two pixels separated from the line position, as calculated for the center line through character-plus-next-space column. If the slope of the segment is over 30 degrees rotation, as shown in FIG. 7E, the character shape has a rotation of 45 degrees through the choice of the appropriate font. If two character fields abut, as discussed, a triangle of 6 pixels is cut off from the abutting corner, thereby allowing various abutting positions that are shifted with respect to each other over a distance of one diagonal pixel. According to a particular formalism, the y and x offsets equal the x and y offsets respectively, multiplied or divided by, respectively the tangent of the line angle. Generally, the displacement with respect to the displayed path is such that the 8×8 pixel character field touches the displayed path. These procedures have generally been determined by empirism. Another method is as follows: the effective font width is the actual width multiplied by the sinus of 45 degrees, the font angle. Next, the center line of the single characters should be equidistant on this actual font width. This makes the row of characters equidistant. The x offset and the y offset are calculated from the intersection of the segment and the centre line. This gives two equations with two unknowns, as follows:

- f(x)=tangent (line angle)*x line segment
- f(x)=-x+font width centre line
- x+tangent (line angle)*x=:-x+font width
- x+tangent (line angle)*x=font width
- (1+tangent (line angle))*x=font width
- x=font width/(1+tangent (line angle))
- y=x*tangent (line angle)

If the slope of a straight path segment is between 30 and 45 degrees, the character orientation of the preceeding straight segment is maintained. In this way, an advantageous hysteresis effect is brought about.

Various additional special aspects are as follows:

- A name need not be positioned at the beginning of a non-straight path, but may be affixed to its second or later straight segment.
- If a path partially falls outside a display window, various possibilities exist. First, the displaying of its name is inhibited. Second, the display is shifted, in that the intercept of the left hand part of the segment with the window edge in question is considered a quasi termination, and the displaying is started at the quasi termination, if applicable on the basis of the two end points of the path in question. This feature may be combined with the abbreviation of the name in question. Thereto the name is stored as an ASCII character string, but part thereof is delimited by a pair of non-displayable delimiter characters. If space is short, the delimited part is left undisplayed. The delimitation is present in the data base.
- If a path is particularly long, it may have its name put in two times, by dividing the path into smaller segments, even if they have the same orientation. Another feature is to symmetrize or shift the name by letting its display start with a string of undisplayed dummy characters.
- To avoid cluttering of names, the following procedure may be used. The various paths are hierarchized as explained supra. First, the higher level paths have their names displayed. The display window is divided into an array of subwindows each corresponding in size to a character field. After deciding for display of a character, its sub-window gets an identifier "occupied". However, if the subwindow had already been occupied by a character belonging to another name, there are various possibilities. The most far reaching is leaving out the name of the lower hierarchic path. Another is to try again with the abbreviated name. A third is to display a dummy character at the occupied subwindow and so shift the further character positions of the later name. Also the full name can be shifted to one side of the forbidden intersection between the two names. A final possibility is to backtrack to the higher level name and undertake a different (shifted or abbreviated) display of the latter in view of a better result while trying to display the lower level name. If necessary, the most advantageous procedure can be indicated by specific qualifiers added to the stored name(s) in question.

● The displaying of the paths and names can be supplemented by names associated with non-path-like geographical elements, such as squares, lakes, mountains, and particular buildings; these are generally displayed as horizontal rows, independent of the displayed map orientation. Further, particular icons may be added, such as those indicating a number of an unnamed road or path, icons for hotels, parking facilities, and the like, which icons may interfere with the name displaying as considered hereabove, and may be considered as a lower or higher hierarchic feature.

● It is not necessary that all roads in a particular part of the net have a steady hierarchic level. For example, the destination road may temporarily get the highest hierarchic level. Another is that roads generally in the direction of traffic get a relatively higher level than roads transverse to the direction of travel, or the other way round. Further, the character of the road and the accomplished state of the route planning may influence the level. If the path to travel is long, main through roads get a higher level. Near the destination, also busy shopping streets would get displayed. Again, this type of allowed level changing may be indicated by a few bits in the data base representation of the road in question.

● It is noted that for abutting character fields in a diagonal direction as described, the background of the character must be transparent to avoid obscuring of neighbouring characters. Further, if the path makes a sharp angle, it may be necessary to either shift the next character over the distance of one character field in an inner curve, of to find an additional character position to avoid an unnecessary space in an outer curve.

We claim:

1. A display system for displaying a net of distinct and interconnected geographical paths having various path orientations and comprising:

(a) storage means for storing said net as an arrangement of vectors each associated with one of said paths, said vectors including a geographical name comprised of characters for its associated path, (b) select means for signalling an intended selection from said net, (c) reading and routing means controlled by said select means for reading said storage means and outputting said selection, (d) display means for displaying said selection including at least one of said paths in its actual orientation, said display means comprising font means for generating a character font for the characters of a name to be displayed adjacent the displayed geographical path of the selection, (e) each said character being displayable in one of a plurality of different character orientations, (f) means for determining the path orientation of each segment of the displayed path where a particular character of its associated name is to be displayed, (g) means for displaying the particular character with one of its character orientations that substantially follows the determined path orientation of the adjacent path segment.

2. A display system as claimed in claim 1, wherein said font means have at least one distinct font for each different orientation.

3. A display system as claimed in claim 1, wherein said routing means transmit a fraction of the street names contained in said selection while blocking further names as an anti-clutter measure.

4. A display system as claimed in claim 1, wherein said display means accommodate shifting of a name along its associated path for containability within a display window or for symmetrizing reasons.

5. A display system as claimed in claim 1, wherein said routing means are arranged for selective abbreviating of a said name.

6. A display system as claimed in claim 1, wherein said display means are arranged for displaying a single name associated to a non-straight path as a string of characters that has variations in either character orientation or row orientation between respective characters.

7. A display system as claimed in claim 6, wherein said non-straight path is divided into a sequence of straight segments, and the orientation of successive characters of said string is modelled according to a local segment direction, while adhering to a hysteresis for an orientation change between successive characters in said string.

8. A display system as claimed in claim 1, and having frame storage means for after said selection storing an actual frame on a pixel-by-pixel basis for subsequent display.

9. A display system as claimed in claim 1, wherein the plurality of different character orientations comprises a fixed number of discrete orientations each separated by a given orientation angle.

10. A display system as claimed in claim 9, wherein the given orientation angle is in the range of 15°–45°.

11. A display system as claimed in claim 1, wherein the plurality of different character orientations comprises 4 orientations including a character orientation rotation of at most ±90° with respect to an upright position.

* * * * *